US008423836B2

(12) United States Patent
Sautter et al.

(10) Patent No.: US 8,423,836 B2
(45) Date of Patent: Apr. 16, 2013

(54) METHOD AND SYSTEM FOR DETECTING A FAILURE IN AN ERROR CORRECTING UNIT

(75) Inventors: Peter Sautter, Lauffen (DE); Harald Tschentscher, Grossbottwar (DE); Carsten Gebauer, Abstatt (DE); Berthold Fehrenbacher, Markgröningen (DE); Roy M. Haley, Sugarland, TX (US); Alexandre Palus, Sugar Land, TX (US); Charles Ming-Fong Tsai, Sugarland, TX (US); Venkata Kishore Gadde, Pearland, TX (US); Hoi-Man Low, Sugarland, TX (US)

(73) Assignees: Texas Instruments Incorporated, Dallas, TX (US); Robert Bosch GmbH, Stuttgart (DE)

( * ) Notice: Subject to any disclaimer, the term of this patent is extended or adjusted under 35 U.S.C. 154(b) by 180 days.

(21) Appl. No.: 12/772,423

(22) Filed: May 3, 2010

(65) Prior Publication Data
US 2011/0087932 A1 Apr. 14, 2011

(30) Foreign Application Priority Data
Nov. 3, 2007 (EP) .................. PCT/EP2007/009542

(51) Int. Cl.
*G06F 11/00* (2006.01)

(52) U.S. Cl.
USPC ....................................... 714/703

(58) Field of Classification Search ........................ None
See application file for complete search history.

(56) References Cited

U.S. PATENT DOCUMENTS

| 4,531,213 | A  | * | 7/1985  | Scheuneman ............... 714/703 |
| 4,924,465 | A  | * | 5/1990  | Matsubara et al. .......... 714/703 |
| 7,020,811 | B2 | * | 3/2006  | Byrd ............................. 714/703 |
| 7,606,695 | B1 | * | 10/2009 | Nouri et al. ..................... 703/22 |
| 2002/0157044 | A1 | * | 10/2002 | Byrd ............................. 714/703 |
| 2007/0113120 | A1 | * | 5/2007  | Dodge ........................... 714/703 |
| 2008/0016428 | A1 | * | 1/2008  | Lee et al. ...................... 714/763 |

FOREIGN PATENT DOCUMENTS
EP 0 028 091 A 5/1981

OTHER PUBLICATIONS

Sule Ozev and Alex Orailoglu, "Design of Concurrent Test Hardware for Linear Analog Circuits with Constrained Hardware Overhead", IEEE Transactions on Very Large Scale Integration (VLSI) Systems, vol. 12, No. 7, Jul. 2004, XP002475941 p. 757, col. 1, line 8-line 17.
Samuel N. Hamilton and Alex Orailoglu, "On-Line Test for Fault-Secure Fault Identification", IEEE Transactions on Very Large Scale Integration (VLSI) Systems, vol. 8, No. 4, Aug. 2000, XP002475942 p. 446, col. 2, line 8-line 16.
International Search Report.

* cited by examiner

*Primary Examiner* — Guerrier Merant
(74) *Attorney, Agent, or Firm* — Robert D. Marshall, Jr.; Wade James Brady, III; Frederick J. Telecky, Jr.

(57) ABSTRACT

In order to detect a faulty error correcting unit (2) in an embedded system, wherein the error correcting unit (2) receives output data from a data source (20) and determines, whether the received data are incorrect, and wherein if the received data are incorrect, the error correcting unit (2) is expected to correct at least one error within the received data, output the corrected data and manipulate an error vector (4), a method and a system (Ia) are suggested that enable to compare the output data of the error correcting unit (2) with at least one reference data, wherein the at least one reference data originate at least indirectly from the data source (20). Both, the error vector (4) and the result of the comparison are input to a plausibility test in order to decide, whether the error correcting unit (2) is faulty. According to the result of the plausibility test, a failure vector (7) is manipulated in order to indicate whether a failure in the error correcting unit (2) is detected.

8 Claims, 4 Drawing Sheets

METHOD AND SYSTEM FOR DETECTING A FAILURE IN AN ERROR CORRECTING UNIT

CLAIM OF PRIORITY

This application claims priority under 35 U.S.C. 120(a) to PCT Patent Application No. PCT/EP2007/009542 filed Nov. 3, 2007.

TECHNICAL FIELD OF THE INVENTION

The technical field of this invention is detecting failure in an error correcting unit.

BACKGROUND OF THE INVENTION

The invention relates to a method for detecting a failure in an error correcting unit, wherein the error correcting unit receives output data from a data source and determines, whether the received data are incorrect, and wherein if the received data are incorrect, the error correcting unit is expected to correct at least one error within the received data, output the corrected data and set an error vector, wherein the error vector at least indicates whether an error has been corrected or whether an error has been detected but could not be corrected.

The invention also relates to a system for detecting a failure in an error correcting unit, wherein the error correcting unit provides means for receiving output data from a data source, means for determining whether the received data are incorrect, means for correcting at least one error within the received data, if the received data are incorrect, means for outputting the corrected data and means for manipulating an error vector, wherein the error vector is adapted to indicate at least whether an error has been corrected or whether an error has been identified but could not be corrected.

Furthermore, the invention relates to a computer program which can be run on a computer, in particular on an embedded system.

Any computer-based system typically is expected to operate correctly and in particular to not produce errors or incorrect results originating from e.g. a faulty hardware element, a faulty software element or a faulty data transmission, independently of whether the failure is a permanent failure or a temporary failure (e.g. caused by an externally induced signal perturbation, power-supply disturbances or radiation from cosmic rays). In order to reach a certain level of reliability of a system, such failures at least have to be detected. Based on error detection, it is known to correct several errors in order to achieve a certain level of fault tolerance.

In order to detect and/or correct errors, computer systems of any kind, for example embedded systems, often provide error correcting units in order to increase the liability of the whole system. Such error correcting units are often based on so-called error correcting codes (ECC) which enable to detect a predefined number of errors that may occur in a data word. ECCs are further enabled to correct a predefined number of detected errors. In order to achieve this, in a first stage for each data that are known to be error-free, several so-called check bits are generated that are attached to the data and are used by the ECC in order to detect one or more errors and to correct at least one of the detected errors. The more errors are to be detected and/or corrected, the more check bits have to be provided. In order to keep the number of check bits at an acceptable level, often so-called SECDED methods are implemented in embedded systems, which enable to correct a single error but to detect a double error.

Generally, any hardware and software component within a computer system or an embedded system might possibly be erroneous. Since an error correcting unit is also realized in software or in hardware, even an error correcting unit might be faulty. A faulty error correcting unit might, for example, "correct" non-existing errors and thus generate errors by itself. Furthermore, faulty error correcting units might indicate that they have corrected an error without doing so.

It is therefore an object of the present invention to increase the liability of a computer system, in particular of an embedded system, comprising an error correcting unit. Furthermore, it is an object of the present invention to provide a method and a system for detecting, whether an error correcting unit is faulty.

SUMMARY OF THE INVENTION

The object is solved by a method as mentioned above, wherein the method comprises a step of comparing the output data of the error correcting unit with at least one reference data, wherein the at least one reference data originate at least indirectly from the data source. Both, the error vector and the result of the comparison are input to a plausibility test in order to decide, whether the error correcting unit is faulty. According to the result of the plausibility test, a failure vector is manipulated in order to indicate whether a failure in the error correcting unit is detected.

According to the present invention, the output of the error correcting unit is compared with reference data, which advantageously may directly correspond to the output data of the data source. This enables to detect a faulty error correcting unit with only little overhead, by providing e.g. a comparator and a plausibility testing unit. The failure vector then indicates, whether the error detecting unit is determined to be faulty. The information stored in the failure vector could be transmitted e.g. to a controlling device which records the information and/or informs an administrator or the like.

The error correcting unit might operate in several different ways. According to a first embodiment, an error vector attached to the error correcting unit might be manipulated whenever the error correcting unit has detected an error, independently of whether the error could be corrected or not. In this embodiment, the failure vector might be manipulated to indicate a failure in the error correcting unit, only if the output data of the error correcting unit differs from the reference data, but the error vector does not indicate an error in the received data.

According to another embodiment, the error correcting unit might manipulate the error vector only if an error is detected that could not be corrected. At least in this example it is advantageous, if the failure vector is manipulated to indicate a failure in the error correcting unit, if the output data of the error correcting unit do not differ from the reference data, but the error vector indicates an error in the received data.

Both constraints are part of the plausibility test and enable to efficiently decide whether an error correcting unit is faulty or not, based on the result of the comparison.

According to another preferred embodiment of the inventive method, the reference data are generated by a second error correcting unit, wherein the second error correcting unit receives the output data from the data source and determines whether the received data are incorrect. At least if a single error is detected, the second error correcting unit corrects at least one error within the received data and outputs the corrected data. According to this embodiment, the results of the first error correcting unit and the second error correcting unit are compared and the plausibility test is based on the result of the comparison.

Advantageously, the second error correcting unit manipulates a second error vector, at least if the received data are incorrect and the error could not be corrected. In this embodiment, the second error correcting unit might operate redundantly to the first error correcting unit. However, it is also conceivable that the strategy for deciding, whether the second error vector is manipulated might differ from the strategy of the first error correcting unit for deciding, whether the first error correcting vector is to be manipulated. It is also conceivable that only a single error vector is used indicating whether at least the first or the second error correcting unit or whether both error correcting units have detected an error.

Having the second error correcting unit, a failure might be detected and the failure vector might be manipulated, whenever the output data of the first error correcting unit defers from the reference data, i.e. the output data of the second error correcting unit. A failure might also be detected and the failure vector might be manipulated, whenever the output data of the first error correcting unit do not defer from the reference data, i.e. the output data of the second error correcting unit, but the first error vector defers from the second error vector.

These conditions allow to be efficiently tested and thus enable to efficiently decide, whether the error correcting unit is faulty.

According to another preferred embodiment, the failure vector identifies the faulty error correcting unit. This is advantageous, if several error correcting units are available that might be faulty. In particular, if a redundant error correcting unit is provided, this embodiment enables to store and possibly communicate, whether the first or the second error correcting unit is faulty.

Advantageously, the failure vector identifies the position of wrongly corrected or uncorrected data bits within the data, in particular within the reference data. These positions can be determined by comparing the output data of the error correcting unit with the reference data. Having knowledge of such a position might be helpful in detecting the software or hardware component within the error correcting unit that is faulty.

According to another preferred embodiment of the present invention, the failure vector is realized using a failure flag. This means, that the failure vector is a one-dimensional vector that can be realized by a single bit. The failure flag shows, whether a faulty error correcting unit is detected or not. Using a failure flag allows fast manipulations of the failure vector and reduces the amount of bits used to indicate whether a faulty error correcting unit is detected.

Advantageously, the error vector might also be realized using an error flag.

The object of the present invention is further solved by a system as mentioned above, wherein the system provides means for executing the inventive method.

The realization of this invention in the form of a computer program is particularly important. The computer program can be run on a calculating device or a computer, in particular on an embedded system, and is programmed to carry out the inventive method. The invention is, thereby, realized by the computer program, wherein this computer program represents the invention in the same sense as the inventive method that is executed by the computer program.

The computer program is preferably stored in a storage element. A storage element may, in particular, be a magnetic solid state or an optical storage device.

Further features, possible applications and advantageous embodiments of the present invention are described in the following description of the drawing.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
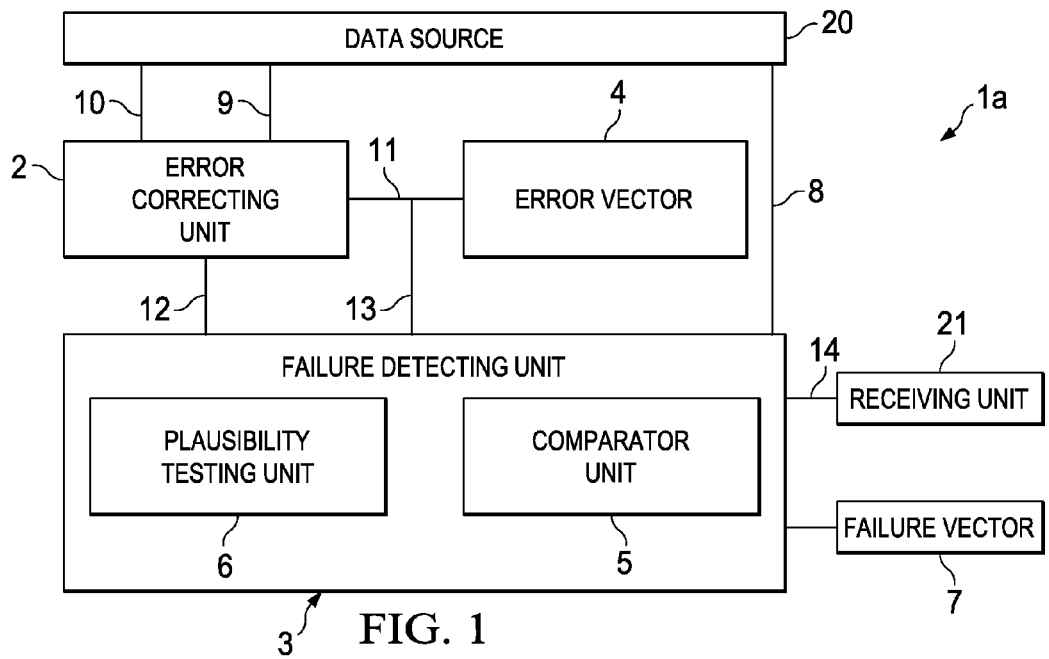
FIG. 1 shows a system for detecting a failure in an error correcting unit according to a first embodiment.

FIG. 1 shows a system 1a comprising an error correcting unit 2 and a failure detecting unit 3. The failure detecting unit 3 comprises a comparator unit 5 and a plausibility testing unit 6.

System 1a further comprises a data source 20. System 1a could be realized using different functional hardware components within an embedded system. System 1a could further be realized in software that is executed within the embedded system. In particular, one or more components of system 1a can be realized in hardware, whereas other components might be realized in software.

Data source 20 emits data bits that are to be transmitted to a receiving unit 21. In order to detect errors in the data bits, each predefined number of data bits are accompanied by a predefined number of check bits, as is commonly known from error correcting code techniques. The data bits and the check bits are transmitted to error correcting unit 2 in order to detect and possibly correct errors, e.g. based on an error correcting code, the data bits and the check bits belong to.

The output of error correcting unit 2 are transmitted to comparator unit 5 via data line 12. The data bits from data source 20 are also directly transmitted to comparator unit 5 via data line 8. The result of comparing the data bits received via data line 8 and the output data received via data line 12 is fed into the plausibility testing unit 6. Upon detecting a faulty error correcting unit 2, failure vector 7 is manipulated.

Figure 2:
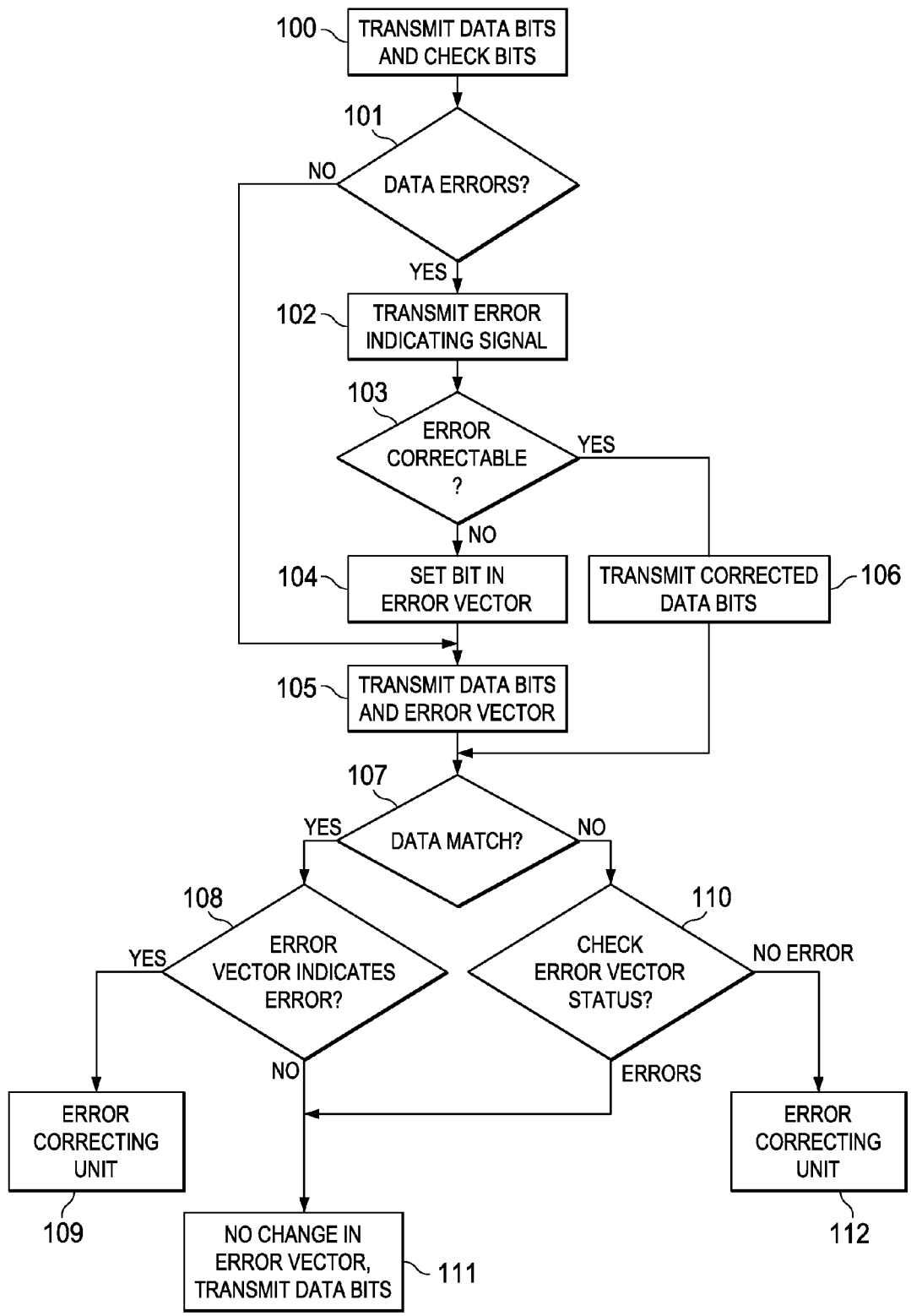
FIG. 2 shows a method for detecting a failure in an error correcting unit according to a first embodiment.

The operation of system 1a is described in more detail in FIG. 2, showing a flow chart of several embodiments of the inventive method.

In a step 100, data bits and check bits are transmitted from data source 20 to error correcting unit 2. Furthermore, the data bits are transmitted via data line 8 to the failure detecting unit 3, in particular to comparator unit 5.

In a step 101, error correcting unit 2 evaluates the error correcting code in order to detect and possibly correct an error. If an error was detected, the error correcting unit 2 transmits a signal indicating the detected error to failure detecting unit 3, in particular to plausibility testing unit 6 in a step 102. Furthermore, the error vector 7 is manipulating indicating that an error was detected.

In a step 103, the error detecting unit 2 tries to correct the detected error. If this is possible, the corrected data bits are transmitted to the failure detecting unit 3 in a step 106. However, if the detected error could not be corrected, the error vector 4 is manipulated in a step 104 in order to indicate this situation. This could be achieved by setting or resetting a specific bit in the error vector 4. The output data as well as the value of the error vector 4 are transmitted to the failure detecting unit 3 in a step 105.

If no error was detected in step 101 the data received from data source 20 are not altered by the error correcting unit 2 at all and transmitted in step 105 as output data to the failure detecting unit 3.

In a step 107, the reference data directly received via data line 8 from the data source 20 are compared with the output data received from the error correcting unit 2. According to the embodiment shown in FIG. 1, the comparison is performed by comparator unit 5.

If the output data and the reference data do not differ, it is checked in a step 108 whether error vector 4 indicates that an error was detected and corrected by the error correcting unit 4. If this is the case, error correcting unit 2 is determined to be faulty, since if an error was detected and corrected, the reference data and the output data received from the error correcting unit 2 must be different, assuming that the error correcting unit 2 is working correctly. Therefore, in a step 109 the failure vector 7 is manipulated in order to indicate that the error correcting unit 2 is faulty.

If in step 108 the error vector 4 indicates that no error was detected or if the error vector 4 indicates that an error was detected that could not be corrected, it is determined that the error correcting unit 2 is not faulty and the plausibility test ends in step 111, where the failure vector 7 is not manipulated at all, indicating that no error in the error correcting unit was detected.

However, if the result of the comparison in step 107 shows that the reference data is different to the output data received from the error correcting unit 2, the error correcting unit 2 must have corrected at least one error, assuming that the error correcting unit 2 is working correctly. Therefore in a step 110 the status of the error vector 4 is checked. If the error vector 4 indicates that at least one error was detected that could be corrected, the plausibility testing unit 6 determines that the error correcting unit 2 is working correctly and the plausibility test ends in step 111 by not manipulating the failure vector 7 and by possibly transmitting the data bits received as output data from the error correcting unit 2 to the receiving unit 21.

If in step 110 the error vector indicates that no error was detected at all or that an error was detected that could not be corrected, it is determined that an error has occurred within the error correcting unit 2. Thus, in a step 112 the failure vector 7 is manipulated to indicate that a failure has occurred in the error correcting unit 2.

Figure 3:
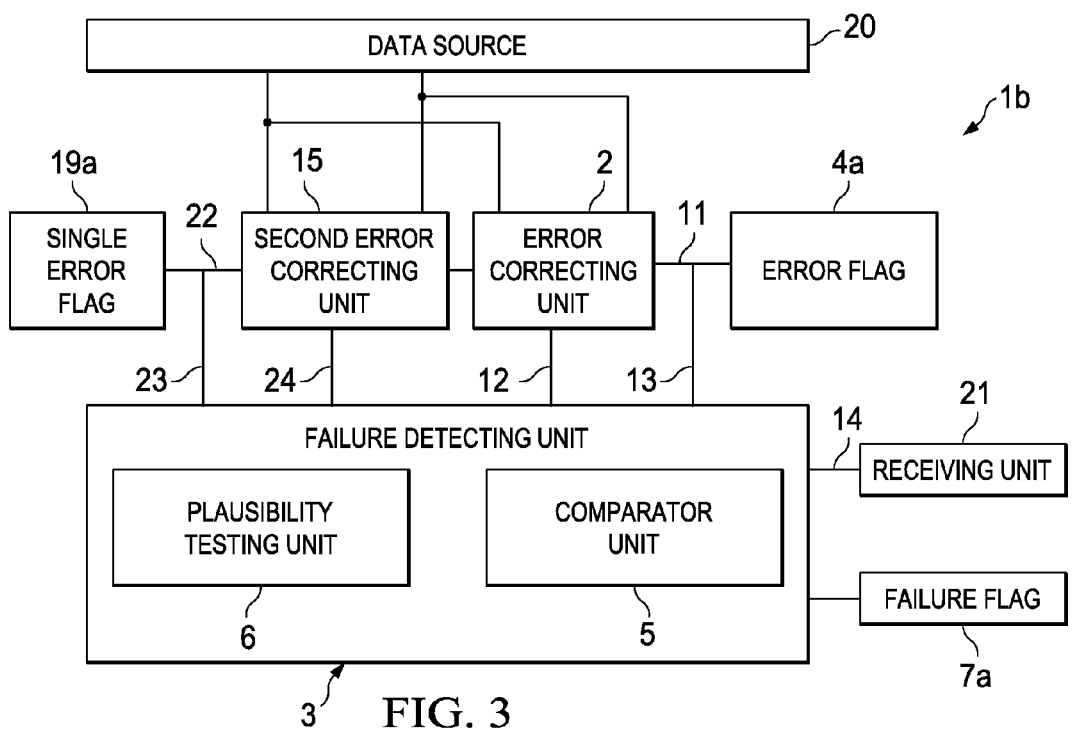
FIG. 3 shows a system for detecting a failure in an error correcting unit according to a second embodiment, the system comprising a second error correcting unit.

FIG. 3 shows another embodiment of a system 1b, wherein elements known from system 1a are denoted with the same reference signs.

System 1b comprises a second error correcting unit 15. The data bits and the check bits emitted from data source 20 are transmitted to error correcting unit 2 and to the second error correcting unit 15. The second error correcting unit 15 is connected via data line 22 with a second error vector, which is embodied as a single error flag 19a. Data line 22 is connected via data line 23 to plausibility testing unit 6.

Furthermore, in FIG. 3 error flag 4 (FIG. 1) is embodied as an error flag 4a and failure vector 7 is embodied as a failure flag 7a.

Figure 4:
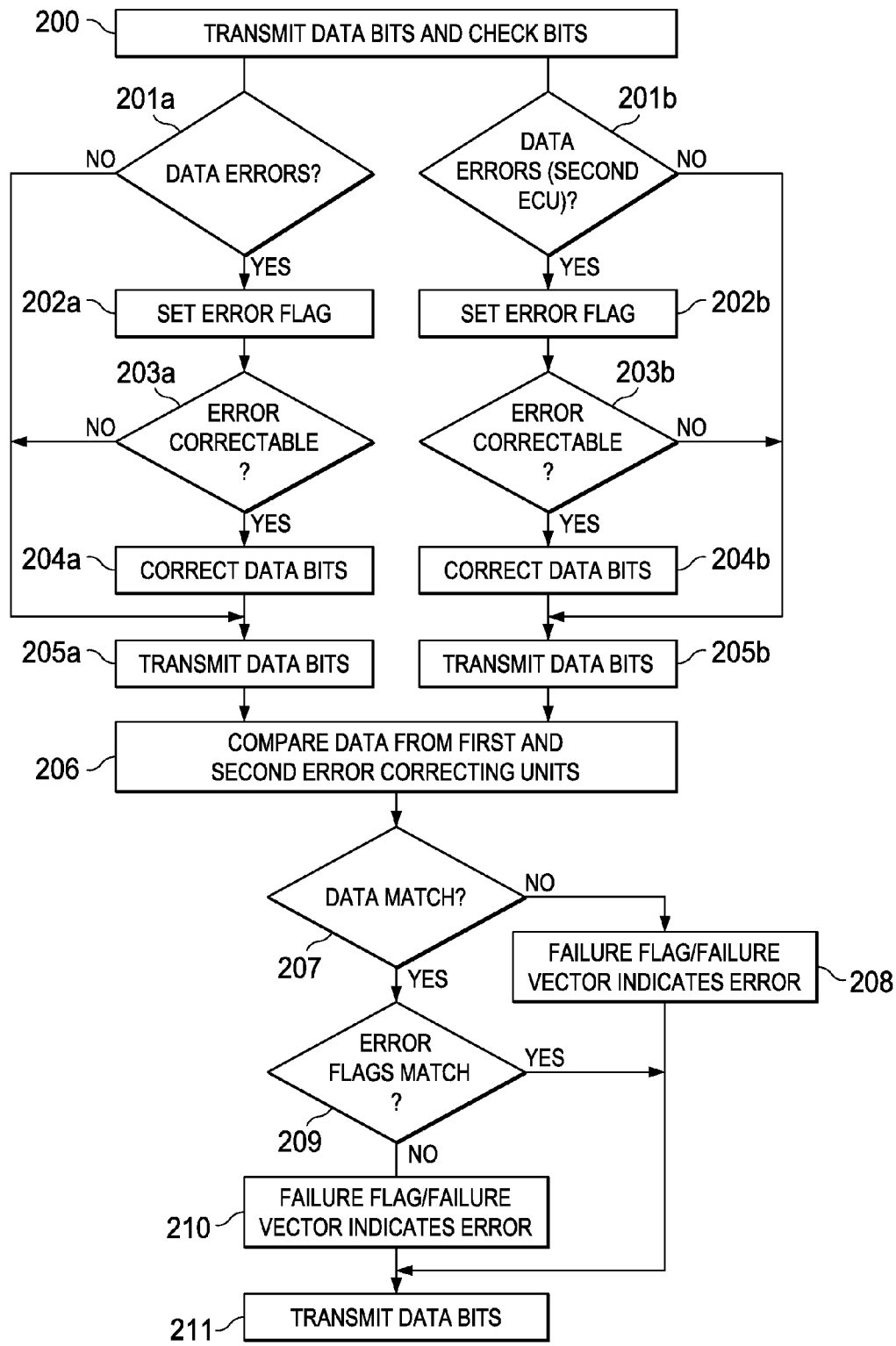
FIG. 4 shows a method for detecting a failure in an error correcting unit according to a second embodiment.

System 1a as shown in FIG. 1 and system 1b as shown in FIG. 3 might be operated differently. An embodiment of the inventive method that is operable on system 1b is shown in FIG. 4. The method starts in a step 200, wherein the data, comprising data bits and check bits are transmitted from data source 20 to the error correcting unit 2 and the second error correcting unit 15.

In a step 201a, error correcting unit 2 detects whether an error has occurred. If this is the case, error flag 4a is set in a step 202a.

In a step 203a, the error correcting unit 2 tries to correct at least one detected error. If this is possible, the error is corrected by manipulating the received data bits, accordingly, in a step 204a and the corrected data are then transmitted to the failure detecting unit 3 in a step 205a.

If, however, in step 201a no error was detected at all or if no error could be corrected in step 203a, the data received from the data source 20 are transmitted to the failure detecting unit 3 in step 205a.

As already described, system 1b comprises a second error correcting unit 15. For the following description, it is assumed that the second error correcting unit 15 provides the same functionality as error correcting unit 2. Thus, the second error correcting unit 15 is totally redundant. However, it is conceivable that second error correcting unit 15 is able to detect and/or correct a number of errors that is different from the number of errors that can be detected and/or corrected by error correcting unit 2.

Referring again to FIG. 4, the data from the data source 20 are transmitted to error correcting unit 2 and also to second error correcting unit 15.

In a step 201b, the second error correcting unit 15 detects whether an error has occurred. If this is the case, error flag 19a is set in a step 202b. In a step 203b, the second error correcting unit 15 tries to correct at least one detected error. If this is possible, the error is corrected by manipulating the received data bits, accordingly, in a step 204b and the corrected data are then transmitted to the failure detecting unit 3 in a step 205b.

If in step 201b no error was detected at all or if no error could be corrected in step 203b, the data received from the data source 20 are transmitted from second error correcting unit 15 to the failure detecting unit 3 in step 205b.

In a step 206, the failure detecting unit 3, in particular comparator 5, compares the output data received from error correcting unit 2 and the reference data received from the second error correcting unit 15. The result of this comparison is then transmitted to plausibility testing unit 6. If error correcting unit 2 and second error correcting unit 15 provide the same functionality, the output data of error correcting unit 2 and the reference data received from second error correcting unit 15 should be identical. This condition is tested by plausibility testing unit 6 in a step 207. If the output data of error correcting unit 2 and the reference data received from second error correcting unit 15 are not identical, the failure flag 7a is manipulated in a step 208 in order to indicate that a failure is detected. However, if the failure flag 7a is realized as a failure vector 7 comprising several bits, the failure vector 7 might be manipulated in order to indicate that the data received from error correcting unit 2 differs from the data received from the second error correcting unit 15.

If—according to the preferred embodiment shown in FIG. 4—in step 207 no difference between the output data received from error correcting unit 2 and the reference data is detected, it is checked in a step 209, whether the values of error flags 19a and 4a are different. The values of error flag 4a and error flag 19a could be transmitted to failure detecting unit 3 by connecting the error indicating output of the second error correcting unit 15 via data line 23 and data line 24 with the plausibility testing unit 6 and by connecting the error indicating output of the error correcting unit 2 via data line 13 with the plausibility testing unit 6. Assuming that error correcting unit 2 and the second error correcting unit 15 realize the same functionality, error flag 4a and error flag 19a should show the same value. If this is not the case, the error correcting unit 2 or the second error correcting unit 15 must be faulty. In order to indicate this situation, in a step 210 failure flag 7a is manipulated, accordingly.

In a step 211, the data are transmitted from failure detecting unit 3 to receiving unit 21.

Systems 1a and 1b as shown in FIGS. 1 and 3, as well as the methods shown in FIGS. 2 and 4 show exemplary embodiments of the inventive system and the inventive method. However, several further embodiments and variations are possible.

Figure 5:
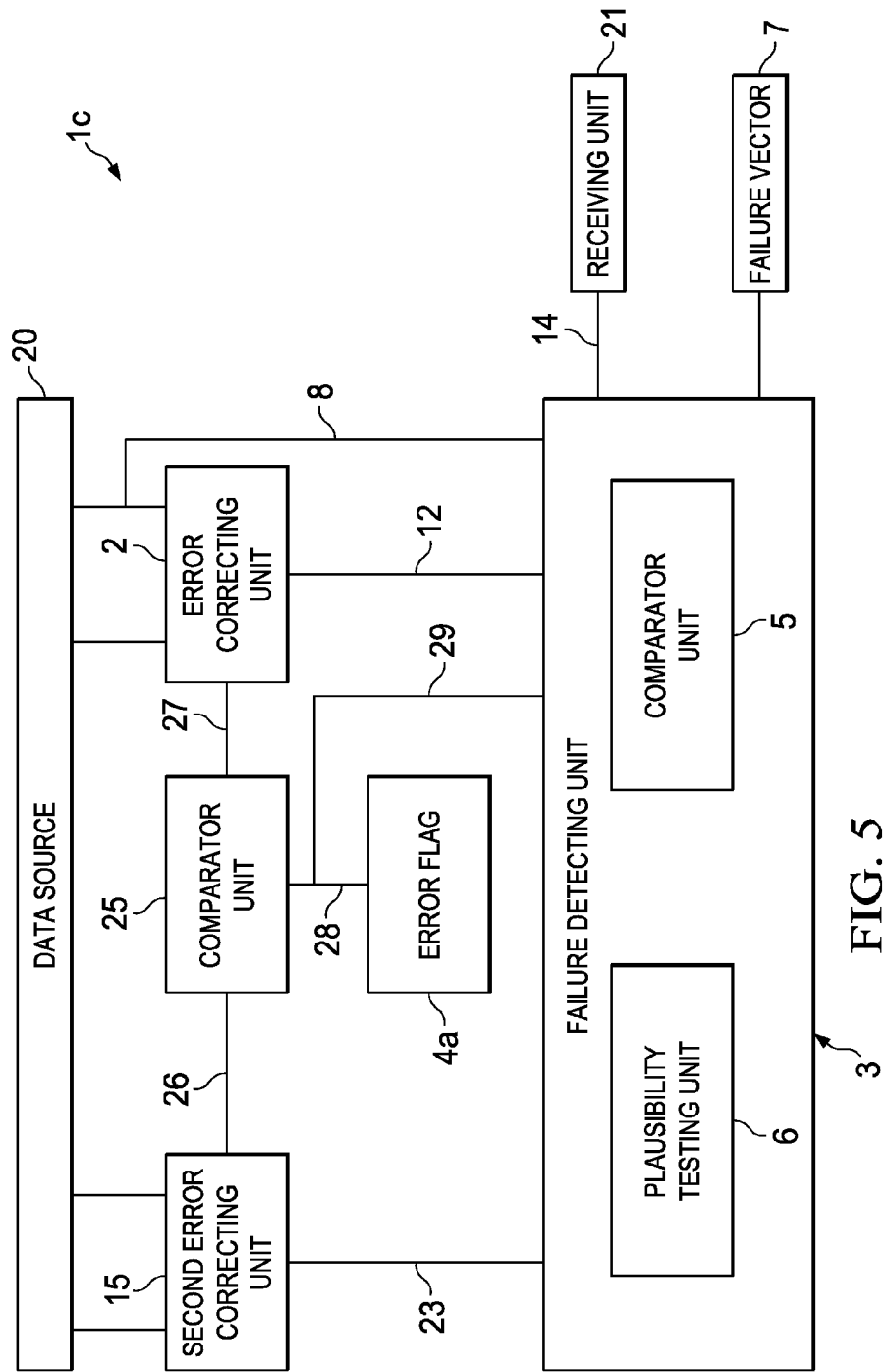
FIG. 5 shows a system for detecting a failure in an error correcting unit according to a third embodiment.

FIG. 5 shows a system 1c, which is an example of another advantageous embodiment of the invention. Therein, instead of using a second error flag 19a or a second error vector, the error indicating output of the second error correcting unit 15 and the error indicating output of error correcting unit 2 are connected via data lines 26 and 27 with a comparator unit 25. Comparator unit 25 is connected via a data line 28 with error flag 4a. However, error flag 4a might also be realized as an error vector 4.

Comparator unit 25 might be operated to only set the error flag 4a, if the signals received from data lines 26 and are not identical. Thus, the error flag 4a enables to indicate that a failure must have occurred in the error correcting unit 2 or the second error correcting unit 15. The signal of comparator unit 25 could automatically be transmitted, e.g. via data line 29, to plausibility testing unit 6.

In system 1c the data from data source 20 are not only transmitted to error correcting unit 2 and the second error correcting unit 15, but also directly to failure detecting unit 3 via data line 8. Comparator unit 5 thus receives three different signals which might be compared and used for plausibility testing. This enables to gain further details whenever a faulty error correcting unit 2 is detected. In particular, it is possible to determine, which of the error correcting units, error correcting unit 2 or second error correcting unit 15, is faulty. Failure vector 7 could be modified accordingly, in order to indicate such an event.

Failure vector 7 could be implemented e.g. as a string of bits, wherein each bit indicates, whether a predefined type of failure is detected. These types might indicate, whether a failure is detected in error correcting unit 2, whether a failure is detected in error correcting unit 15, or whether error correcting unit 2 or error correcting unit 15 fails in setting error flag 4a correctly.

Further embodiments of the inventive method and the inventive systems are possible, as indicated by the claims. In particular, the methods might comprise several further steps in order to determine, whether error correcting unit 2 is faulty and/or to generate more details concerning the kind of error.

Furthermore, several further redundant error correcting units might be provided in order to both, identify a faulty error correcting unit 2, 15 more precisely and increase fault tolerance.

Since all signals might be transmitted from error correcting unit 2, second error correcting unit 15 and/or data source 20 to failure detecting unit 3 nearly concurrently, several comparisons and determination steps might also be performed concurrently or in another order.

What is claimed is:

1. In a method for detecting a failure in an error correcting unit (2), wherein the error correcting unit (2) receives output data from a data source (20) and determines whether the received data are incorrect, and wherein if the received data are incorrect, the error correcting unit (2) is expected to correct at least one error within the received data, output the corrected data, and manipulate an error vector (4), wherein the error vector (4) at least indicates whether an error was corrected or whether an error was identified but could not be corrected, the improvement comprises the steps of
   a. comparing the output data of the error correcting unit (2) with at least one reference data, wherein the at least one reference data originate at least indirectly from the data source (20),
   b. testing plausibility based on the result of the comparison and the error vector (4) including
      indicating plausibility if the comparing step indicates a match and the error vector (4) either indicates that no error was identified or that an error was identified that could not be corrected, or if the comparing step indicates not a match and the error vector (4) indicates an error was identified and corrected, and
      indicating non-plausibility if the comparing step indicates a match and the error vector (4) indicates an error was identified and corrected, or if the comparing step indicates not a match and the error vector (4) indicates either that no error was identified or that an error was identified that could not be corrected,
   c. manipulating a failure vector (7) upon the result of the plausibility test, wherein the failure vector (7) indicates a failure in the error correcting unit (2) if the result of the plausibility test is non-plausible and indicates not a failure in the error correcting unit (2) if the result of the plausibility test is plausible.

2. The method of claim 1, characterized in that the reference data correspond to the output data of the data source (20).

3. The method of claim 1, further comprising the steps of:
   supplying the output data from the data source (20) to a second error correcting unit (15);
   determining via the second error correcting unit (15) whether the received data are incorrect and wherein if the received data are incorrect, the second error correcting unit (15) correcting at least one error within the received data, outputting the corrected data and manipulating a single error flag (19a), wherein the single error flag (19a) at least indicates whether an error was corrected or whether an error was identified but could not be corrected; and
   wherein the reference data of said comparing step are the output data of the second error correcting unit (15).

4. The method of claim 3, characterized in that the failure vector (7) is manipulated to indicate a failure in the error correcting unit (2), if
   a. the output data of the error correcting unit (2) differ from the output data the second error correcting unit (15); or
   b. the output data of the error correcting unit (2) do not differ from the output data of the second error correcting unit (15) but the error vector (4) differs from the single error flag (19a).

5. An apparatus (1a, 1b, 1c) for detecting a failure comprising
   an error correcting unit (2), wherein the error correcting unit (2) comprises
      means for receiving output data from a data source (20),
      means for determining whether the received data are incorrect,
      means for correcting at least one error within the received data, if the received data are incorrect,
   an error vector (4) adapted to at least indicate whether an error was corrected by said error correcting unit (2) or whether an error was identified but could not be corrected by said error correcting unit (2), a failure detecting unit (3) connected to the error correcting unit (2) and the error vector (4), wherein the failure detecting unit (3) comprises

- a comparator unit (5) comparing the output data of the error correcting unit (2) with at least one reference data, wherein the at least one reference data originate at least indirectly from the data source (20),
- a plausibility testing unit (6) testing plausibility based on the result of the comparison of said comparator unit (5) and the error vector (4), said plausibility testing unit (6)
  - indicating plausibility if the comparator unit (5) indicates a match and the error vector (4) either indicates that no error was identified or that an error was identified that could not be corrected, or if the comparator unit (5) indicates not a match and the error vector (4) indicates an error was identified and corrected, and
  - indicating non-plausibility if the comparator unit (5) indicates a match and the error vector (4) indicates an error was identified and corrected, or if the comparator unit (5) indicates not a match and the error vector (4) indicates either that no error was identified or that an error was identified that could not be corrected, and wherein the failure detecting unit (3) manipulating a failure vector (7) upon the result of the plausibility testing unit (6), wherein the failure vector (7) indicates whether a failure in the error correcting unit (2) is detected.

6. The apparatus of claim 5, wherein:
the reference data corresponds to the output data of the data source (20).

7. The apparatus of claim 5, further comprising:
- a second error correcting unit (15), wherein the second error correcting unit (15) comprises
  - means for receiving the output data from the data source (20),
  - means for determining whether the received data are incorrect,
  - means for correcting at least one error within the received data if an error is detected, and
  - means for outputting the corrected data, and
- a second error flag (19a) adapted to at least indicate whether an error was corrected by the second error correcting unit (15) or whether an error was identified but could not be corrected by the second error correcting unit (15).

8. The apparatus of claim 7, wherein:
the failure detecting unit (3) manipulates the failure vector (7) to indicate a failure in the error correcting unit (2), if
  a. the output data of the error correcting unit (2) differ from the output data of the second error correcting unit (15); or
  b. the output data of the error correcting unit (2) do not differ from the output data of the second error correcting unit (15) but the error vector (4) differs from single error flag (19a).

* * * * *